April 22, 1924.
H. M. GRAY ET AL
DIRIGIBLE HEADLIGHT
Filed Feb. 17, 1922
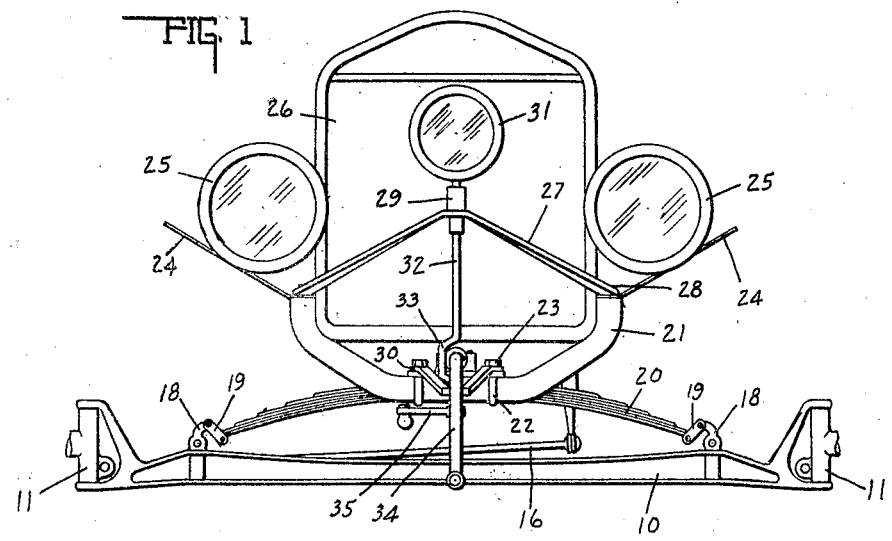
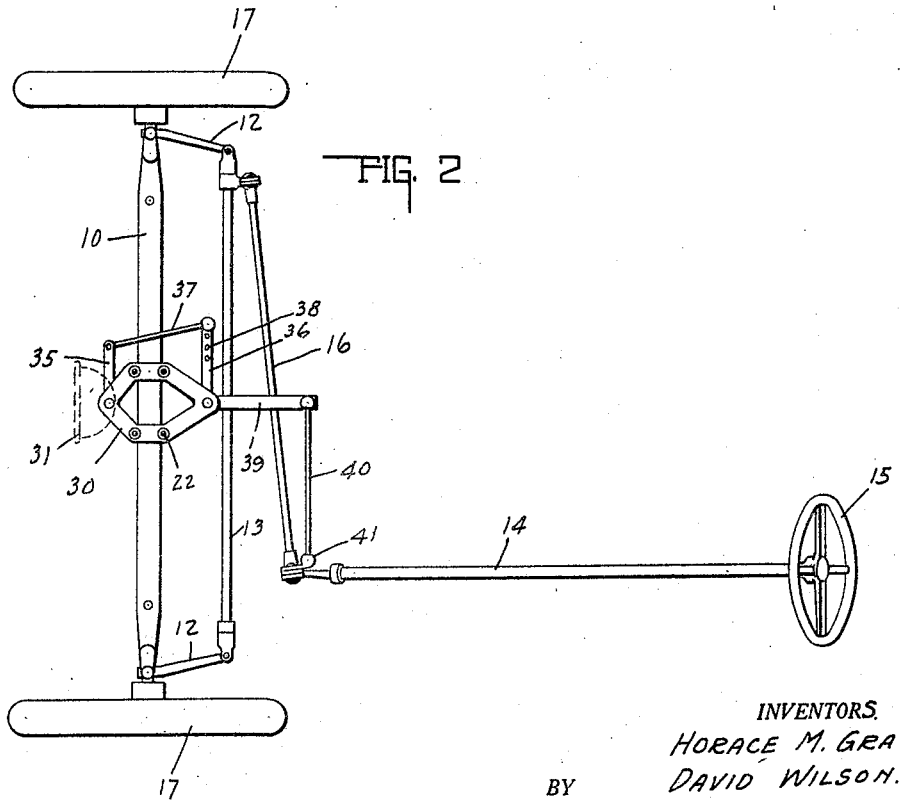
INVENTORS.
HORACE M. GRAY.
BY DAVID WILSON.
ATTORNEYS.

Patented Apr. 22, 1924.

1,491,037

UNITED STATES PATENT OFFICE.

HORACE M. GRAY AND DAVID WILSON, OF ANDERSON, INDIANA.

DIRIGIBLE HEADLIGHT.

Application filed February 17, 1922. Serial No. 537,210.

*To all whom it may concern:*

Be it known that we, HORACE M. GRAY and DAVID WILSON, citizens of the United States, and residents of Anderson, county of Madison, and State of Indiana, have invented a certain new and useful Dirigible Headlight; and we do hereby declare that the following is a full, clear, and exact description thereof, reference being had to the accompanying drawings, in which like numerals refer to like parts.

This invention relates to a mounting for a headlight construction, and the means for connecting the headlight and the steering wheels of a self-propelled vehicle, whereby said headlight will be dirigibly movable with said wheels.

The chief feature of the invention consists in the provision of an auxiliary headlight and its connection with the steering wheel means so that said lamp will be movable with said steering wheel means when the latter is actuated to turn the steering wheels of a vehicle.

Another feature of the invention consists in the particular details of construction, whereby existing parts of a particular type of vehicle are utilized to support the additional and dirigible headlight.

The full nature of this invention will be understood from the accompanying drawings and the following description and claim.

In the drawings Fig. 1 is an elevational view of the front of a motor vehicle of the Ford type to which the invention has been applied. Fig. 2 is a top plan view of the associated parts of the motor vehicle and the means connecting the lamp thereto for movement.

In the drawings 10 indicates the front axle which supports the right and left spindle body portions 11. The right and left spindle body portions are connected by means of the pair of spindle arms 12 and the spindle connecting rod 13. The spindle connecting rod is connected to a steering gear 14 carrying the steering wheel means 15 by means of the steering gear connecting rod 16. The spindles 11 support the usual steering wheels 17. All of the aforesaid construction is old in the art and is of the type found in what is called the Ford automobile.

The front wheel supporting structure hereinbefore described also includes a pair of perches 18 which support, by means of the shackles 19, a main leaf spring 20, the leaves of which are secured together at their centers by a yoke 21, which yoke is secured to said spring leaves by means of the U-bolts 22 and the nuts 23. The yoke 21 supports the frame of the vehicle and also the fenders 24 thereof. Adjacent the fenders, and suitably supported, are the customary lamps 25, each lamp being positioned at one side of the radiator. Extending transversely across the vehicle and forwardly of the radiator is a spanning strap 27 which is secured at each end to the yoke or frame 21 by the same means 28 which secures the fenders 24 thereto. The spanning strap 27 intermediate its ends is provided with a bearing portion 29. The U-bolts 22 and nuts 23 not only secure the yoke 21 to the spring leaves 20, but also support and secure in a median position a hollow hexagonal plate 30, the forward and rearward portions of which are positioned in a plane other than that of the securing portions of said plate, see Fig. 1. A bearing is provided in each end of the plate, that in the forward end registering with the bearing 29 hereinbefore described.

An auxiliary headlight 31 is positioned intermediate the headlights 25 and forwardly of the radiator and is rotatably supported by the shaft 32, which shaft is rotatably supported in the bearing 29 and the forward bearing in the plate 30. The shaft 32 is offset at 33 so as to permit the crank handle 34 to be associated with the crank shaft in the customary manner. The shaft 32 extends downwardly through the plate 30 and supports a lever 35, which lever is connected to one arm 36 of a bell crank lever pivotally supported in the other or rearward end of the plate 30. Said levers are connected together by means of a link 37, which link provides a ball and socket connection with each of the levers. Herein the bell crank lever is shown provided with the openings 38 so that an adjustable connection may be obtained. The other arm 39 of the bell crank lever 36 is connected to a link 40, which in turn is connected by a lug 41, said lug being interposed between the connection of the steering gear connecting rod and the steering gear 16 and 14 respectively hereinbefore described.

From the foregoing it will be understood that whenever the steering wheel means 15 is actuated to turn the steering wheels 17 to the right or to the left, the link 40 will likewise be actuated to rock the bell crank in the bracket 30, which in turn, by means of the link 37 and the lever 35, rocks the shaft or turns said shaft 32 to simultaneously turn the lamp 31 in the direction that the wheels 17 are turned, and by means of the adjustable connection said amount of turn performed by the lamp 31 may be equal to that of the wheels 17.

From the foregoing it will be understood that the additional lamp 31 is positioned medianly with respect to both of the headlights customarily employed and does not interfere with the operation thereof. Likewise said last mentioned headlights are rigidly supported and with the attendant advantages thereof. The auxiliary lamp is the only movable lamp and is directly associated with the steering wheels so as to be movable therewith and in the direction that said wheels are turned. Likewise it will be noted that the particular arrangement of the parts and the construction thereof are such that the same may be readily associated with the particular type of vehicle, to wit, the Ford, heretofore described.

The invention claimed is:

In a lamp support for a vehicle having a main spring, a yoke secured thereto intermediate the ends thereof, a frame supported by said yoke and secured thereto, and steering wheels supporting said spring, comprising the combination of a supporting plate positioned adjacent the yoke and spring and simultaneously secured thereto by the yoke and spring securing means, a supporting strap extending transversely of the vehicle above said spring and yoke and simultaneously secured at opposite ends to said frame by the frame and yoke securing means, and a shaft rotatably supported by said strap and said plate and connected to the wheels for movement therewith.

In witness whereof, we have hereunto affixed our signatures.

HORACE M. GRAY.
DAVID WILSON.